United States Patent [19]

Aldrich

[11] Patent Number: 4,517,205

[45] Date of Patent: May 14, 1985

[54] CO-DEPOSITED TWO-COMPONENT HARD CANDY

[75] Inventor: Deborah G. Aldrich, Stamford, Conn.

[73] Assignee: Nabisco Brands, Inc., Parsippany, N.J.

[21] Appl. No.: 455,162

[22] Filed: Jan. 3, 1983

[51] Int. Cl.³ .................. A23G 3/00; A23G 3/20; A23G 9/24
[52] U.S. Cl. .................. 426/103; 426/660
[58] Field of Search .............. 426/103, 3-6, 426/660

[56] References Cited

U.S. PATENT DOCUMENTS

| | | | |
|---|---|---|---|
| 3,062,662 | 11/1962 | McDonald | 426/134 |
| 3,477,394 | 11/1969 | Tidwell | 426/134 |
| 4,229,482 | 10/1980 | Kreske | 426/660 |
| 4,229,484 | 10/1980 | Steels et al. | 426/660 |
| 4,254,149 | 3/1981 | Rudolph et al. | 426/660 |
| 4,352,825 | 10/1982 | Cheruhuri et al. | 426/5 |
| 4,372,942 | 2/1983 | Cimiluca | 426/660 |
| 4,399,154 | 8/1983 | Puglia et al. | 426/5 |

*Primary Examiner*—Jeanette Hunter
*Attorney, Agent, or Firm*—Richard Kornutik

[57] ABSTRACT

A codeposited two-component hard candy having a hard candy shell portion and a core portion which may be soft, and method of making such candy.

18 Claims, 5 Drawing Figures

CO-DEPOSITED TWO-COMPONENT HARD CANDY

BACKGROUND OF THE INVENTION

The present invention relates to the art of making hard candies and, in particular, to a hard candy having a comparatively soft center and method of producing such candy.

Throughout its history, the confectionary industry has continually directed its attention toward producing, among other things, a hard candy product having both desirable organoleptic characteristics and flavor, as well as an attractive, appetizing appearance. Efforts in the art of making hard candy have included replacement of flavor ingredients to reduce costs, minimize calorie content, improve physical characteristics, etc. Basically, such efforts are oriented toward making a suitable product at a reasonable cost.

One notion which frequently recurs throughout the confectionary industry, inclusive of the hard candy art, is to produce an attractive confectionary unit having more than one physical manifestation such as color, texture and light transmission characteristics, and/or more than one component, i.e., a center-filled candy. Usually, confections having such qualities require specialized, mechanically-intricate equipment, as well as additional time and labor to produce.

For example, U.S. Pat. No. 4,260,596 to Mackles shows an edible unit dosage form for delivering a liquid or soft gel product which includes a hard outer shell covering formed by chilling a molten mannitol or mannitol composition in a hemisphere mold until a sufficiently thick wall has been formed. The remaining molten composition is withdrawn leaving a shaped hemisphere. After the shell is made, a liquid or gel product is introduced which may contain a variety of drugs. The shell is then sealed by melting certain water soluble materials, which are generally floatable, such as carbowax, mannitol and sorbitol, and pouring them into the opening in the shell whereupon a roof for the shell is formed upon cooling of the melted material.

U.S. Pat. No. 3,666,388 to Oberwelland, et al. discloses a method for producing hollow "sweetmeats" made, for example, of hard blocked or confectioner's sugar, liquorice, fondant cream, jelly, or confectioner's cream by spinning an open top mould containing a measured quantity of castable confectionary material and cooling the body until it forms a shell. These hollow sweetmeats can be filled with readily volatilizing substances such as alcohol, aroma substances and the like.

In each of these methods, as in most procedures for making a filled candy, separate shell-forming and filling steps are required.

Moreover, U.S. Pat. No. 3,496,886 to Fohr describes a process for manufacturing liquid-filled candies with a crust by cooling a liquid filling consisting of water, sugar, and flavoring agents, to a temperature below the sugar saturation temperature before casting the rapidly cooled filling liquid into molds to form a candy unit with a hard crust. This procedure is limited, however, to a narrow range of candy product. Furthermore with regard to soft candy, U.S. Pat. No. 4,229,484 to Steels, et al. shows a method of making center-filled bars of chocolate by depositing shell forming and filling material from two separated and independently heated hoppers by means of pairs of independently operated plungers.

Therefore, it is among the objectives of the present invention to provide a two-component hard candy product and an efficient, commercially feasible method of producing such a candy.

Another objective is to provide a two-component hard candy product having a soft center and an outer shell portion which, optionally, has optical properties, such as light transmission and color, different from the center or core portion.

A further objective of this invention is to provide an efficient method of producing a two-component hard candy which is readily adaptable to commercial production of the candy.

SUMMARY OF THE INVENTION

By means of the present invention there is provided a codeposited two-component hard candy having a hard candy shell portion which completely encases a core portion, which, in turn, may advantageously be of viscous or even liquid material. The present two-component hard candy can be efficiently produced by codepositing the core composition in timed sequence with the shell portion composition into a mold cavity in such a manner that the core portion is fixed in the approximate center of the resulting candy unit.

Two-component hard candy units can be made according to the present invention by a unique selection of ingredients for each of the components which are combined to form compositions which are nearly equal in specific gravities. In particular the difference between the specific gravity of the shell portion composition and the core portion composition can be no greater than about 0.20; preferably it is no greater than about 0.12; and most preferably, the difference is no greater than about 0.08.

Further in accordance the present invention, the core portion composition cannot have an overall boiling point which is less than the shell portion composition and the level of moisture in the core portion composition should be less than about 20% by weight based on the core composition, and is preferably less than about 15% by weight.

As a result of this new development, a hard candy unit can be made, at a commercial production level, having a core portion which is distinctive from the shell portion in texture, flavor, and optical characteristics such as color and light transmission. Moreover, the present invention enables practitioners to conveniently include an active ingredient in an attractive, organoleptically-pleasing, hard candy confection.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
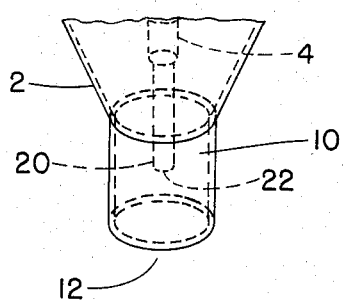
FIG. 1 shows the initiation of codeposition of the present two-component hard candy.

The two-component hard candy of the present invention is made by codepositing a core composition with a hard candy composition which forms the shell portion completely around the core portion. A hard candy composition for the shell can be prepared pursuant to known procedures using ingredients known in the art of making hard candy. The primary ingredient in hard candy is a sweetener, which includes sucrose, sugar alcohols, fructose, corn syrup, invert sugar, intensive sweeteners (natural or synthetic), and combinations of such ingredients, and, optionally, a flavoring ingredient and a coloring agent or dye. Representative of a typical hard candy composition is an aqueous solution of from about 45 to about 70% by weight sucrose, from about 30 to about 55% by weight of corn syrup solids, and from 0 to about 3% by weight of flavoring and/or color agent. Ideally, a hard candy composition can contain from about 58 to about 62% by weight sucrose, from about 38 to about 42% corn syrups, and from about 0.01 to about 3% flavoring. Usually flavoring levels are from 0.5 to about 1.5% by weight.

While the core portion of the present two-component candy can be either hard or soft (e.g., fondant, viscous, or liquor), it has been found that inclusion of a viscous or liquid core portion has a particularly effective impact on the consumer. In the case of a hard candy core portion, the same ingredients as listed above relative to the shell portion could be used. Where a soft core is desired, however, ingredients such as glycerin, honey, milk-based products like chocolate, and active ingredients are contemplated for use in the core portion. In view of the fact that the two-component candy unit must remain stable for a period of time, the core portion should contain no more than about 20% by weight of moisture, and preferably no more than about 15% of moisture. In this way degradation of the shell portion, such as by "graining", is prevented.

When a viscous core is desired, a composition can be used which has the following general formula:

| Viscous Core Ingredient | Percent Range by Weight |
| --- | --- |
| Sugar | 20–40% |
| Liquid Corn Syrup | 20–40% |
| Glycerin | 20–40% |
| Honey | 0–10% |

The amount of shell portion of the hard candy unit is from about 50 to about 95% by weight, and preferably from about 75 to about 80% by weight, whereas the core portion is from about 5 to about 50% of the hard candy unit, and preferably from about 20 to about 25% by weight.

After the compositions for the two components are prepared, they are fed into holding tanks, such as hoppers, capable of maintaining elevated temperatures and of disposing the respective composition as a shell portion and a core portion as appropriate. Referring to the drawing the shell composition is fed to a generally circular nozzle 2 which deposits the shell composition in a generally circumferential hollow cylinder 10. The core composition is fed to a codepositing orifice 4 which is located within the circular nozzle 2 so that the core composition is codeposited as a core tube 20 completely surrounded by shell cylinder 10. The leading edge 22 of core tube 20 follows the edge 12 of shell cylinder 10 by a timed sequential codeposition of the core composition. This timed sequential codeposition facilitates formation of the shell completely around the core portion.

Figure 2:
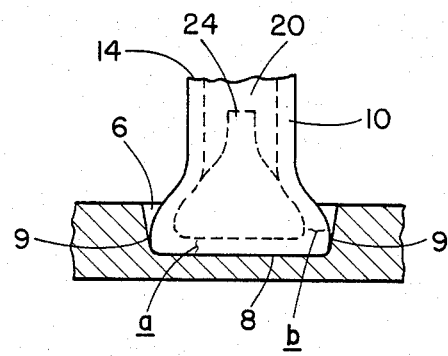
FIG. 2 depicts the codeposited components as they are formed in the mold cavity.
Figure 4:
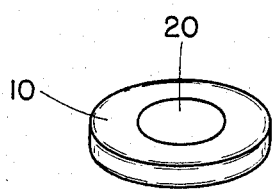
FIGS. 4 and 5 are examples of the codeposited two-component hard candy product of the present invention.
Figure 5:
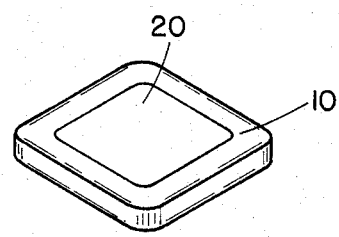

As shown in FIG. 2, the side 9 of mold cavity 6 directs the leading portion of the shell cylinder 10 inwardly on cavity bottom 8 to form the bottom of the shell which is indicated as having a thickness a. Due to the subsequent arrival of the core tube 20 after the bottom 8 of the mold cavity has been covered with shell composition in the amount of thickness a, the core composition spreads within the deposited shell composition in conformity with the deposited shell to form a core in said candy having the same configuration as the cavity 6, e.g., in an oval cavity, an oval core is formed; and in a square cavity a square core is formed (See FIGS. 4 and 5). The sides of the shell are formed having a thickness b (which is usually larger than shell bottom thickness a) by the fixation of shell composition between the core and the sides 9 of the cavity.

Figure 3:
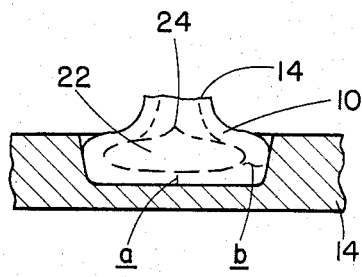
FIG. 3 shows the termination of the codeposition.

Similar to the time sequential codeposition initiating the formation of the hard candy unit, the codeposition of the core is terminated prior to the termination of the deposition of the shell portion, thus forming terminal edges 24 and 14, respectively. In this way the core codeposition ceases before the shell deposition, as is shown in FIG. 3, to allow the remaining shell composition to form the top of the shell over the core portion thus completing the total encasement of the core in the shell.

It has been discovered that if the density of the core composition is significantly different than the density of the shell composition, as for example measured by the respective specific gravities of the two compositions, the core will sink or rise within the shell while compositions are in the molten state. Consequently, the compositions should be prepared so that their respective specific gravities be as nearly equal as possible, and in any event the difference should not be more than about 0.20, preferably not more than about 0.12, and most preferably the difference in specific gravities should not be more than about 0.08.

Furthermore, since the core composition is deposited on the shell composition, the boiling point of the core should not be less than the boiling point of the shell. Otherwise, the core may well boil off in whole or part before completion of the codeposition and setting.

EXAMPLES

Using the composition and method described above a shell composition was prepared by dissolving 60% sugar in an aqueous solution, followed by blending in 40% corn syrup solids. The resulting solution was cooked to about 305° F. in order to reduce the moisture to less than about 3%.

A core composition was prepared using 30% sugar, 30% liquid corn syrup, 10% water and 30% glycerin. The sugar was dissolved in the water, and the corn syrup was added followed by cooking to approximately 150° C. Heat was removed and the glycerin stirred in, after which the mixture was cooled to about 100° F.

Each of the above compositions was fed into a sequence heated hopper. The shell composition was maintained at about 290° F., while the core composition was held at about 100° F. for deposition.

Candy units were formed by codepositing the compositions in generally oval-shaped mold cavities. The resulting hard candy had a clear shell portion and a dark, uniformly-shaped oval core which appeared to be located in the center of the shell.

Other samples were successfully prepared as described above but replacing half of the portion of corn syrup with honey.

Therefore, while there have been described what are presently believed to be the preferred embodiments of the invention those skilled in the art will realize that changes and modifications may be made thereto without departing from the spirit of the invention, and it is intended to claim all such changes and modifications as fall within the true scope of the invention.

I claim:

1. A codeposited two-component hard candy comprising:
   50 to 95% by weight of a clear hard candy component shell portion and consisting essentially of a sweetener selected from the group consisting of sucrose, fructose, corn syrup, invert sugar and intensive sweeteners and combinations thereof, and, optionally, a flavoring ingredient and a coloring agent or dye, and
   5 to 50% by weight of a fondant, liquid or viscous core portion completely encased in said shell portion, said core portion having a moisture content of no more than 20% by weight and comprising ingredients selected from the group consisting of glycerin, honey, sucrose, corn syrup, sugar alcohols, fructose, a heat stable active ingredient, flavoring and milk based products,
   said core portion having color and light transmission characteristics different from those of said shell portion, and
   wherein the difference between the specific gravity of said shell portion and the specific gravity of said core portion composition is not more than about 0.20 and the core portion comprises a core component with an overall boiling point which is not less than the boiling point of the hard candy component of the shell portion.

2. The codeposited two-component hard candy of claim 1 wherein said shell portion includes from about 45 to about 70% by weight of sucrose, and from about 30 to about 55% by weight of corn syrup solids.

3. The codeposited two-component hard candy of claim 2 wherein said shell portion further comprises flavoring and a coloring agent.

4. The codeposited two-component hard candy of claim 3 wherein said shell portion includes from about 58 to 62% sucrose and from about 38 to about 42% corn syrup and from about 0.01 to about 3% flavoring.

5. The codeposited two-component hard candy of claim 4 wherein said flavoring is present in an amount of from about 0.5 to about 1.5% by weight.

6. The codeposited hard candy of claim 1 wherein said core portion contains not more than about 15% moisture.

7. The codeposited two-component hard candy of claim 1 wherein said core portion composition contains from about 20 to about 40% by weight sugar, from about 20 to about 40% by weight liquid corn syrup, from about 20 to about 40% by weight glycerin, and from about 1 to about 10% by weight honey.

8. The codeposited two-component hard candy of claim 1 wherein said difference is not more than about 0.12.

9. The codeposited two-component hard candy of claim 8 wherein said difference is not more than about 0.08.

10. The codeposited two-component hard candy of claim 1 wherein said shell portion is from about 75 to about 80% by weight of said candy and said core portion is from about 20 to about 25% of said candy.

11. A method of producing a two-component hard candy comprising:
    depositing a viscous clear hard candy shell composition in a generally circumferential flow pattern into a mold cavity, the bottom of which directs said circumferential flow of viscous shell composition to form a bottom of said shell portion,
    said hard candy shell composition comprising 50 to 95% by weight of said two-component hard candy and consisting essentially of a sweetener selected from the group consisting of sucrose, fructose, corn syrup, invert sugar and intensive sweeteners and combinations thereof, and optionally, a flavoring ingredient and a coloring agent or dye,
    codepositing a core portion composition configured within said circumferential flow of shell composition at a time sequence so that said core composition arrives at the interior of said mold cavity after said shell bottom has been formed, whereby the sides of said shell portion are formed by fixation of said circumferential flow between codeposited core composition and the vertical walls of said mold cavity,
    said core portion composition comprising 5 to 50% by weight of said two-component hard candy and being of a fondant, liquid or viscous material having a moisture content of no more than 20% by weight and comprising ingredients selected from the group consisting of glycerine, honey, sucrose, corn syrup, sugar alcohols, fructose, a heat stable active ingredient, flavoring and milk based products, and said core portion having light and color transmission characteristics different from those of said shell portion, and
    wherein the difference between the specific gravity of the hard candy shell and the core portion composition is not more than about 0.20 and the core portion composition has an overall boiling point which is not less than the boiling point of the hard candy shell composition,
    initially terminating said codeposition of said core composition while said circumferential flow of said shell composition is still being deposited, and
    finally, terminating said deposition of said shell composition circumferential flow whereby the terminal part of said shell portion circumferential flow forms the top of said shell.

12. The method of claim 11 wherein the difference between the specific gravity of said viscous hard candy shell composition and said core portion composition is not more than about 0.18.

13. The method of claim 12 wherein said difference is not more than about 0.12.

14. The method of claim 13 wherein said difference is not more than about 0.05.

15. The method of claim 11 wherein the temperature of said shell composition is from about 285° to about 305° F. at the time of deposition.

16. The method of claim 15 wherein said deposition temperature is about 290° F.

17. The method of claim 11 wherein the temperature of said core portion composition is from about 90° to about 110° F. at the time of codeposition.

18. The method of claim 17 wherein said codeposition temperature is about 100° F.

* * * * *